(12) United States Patent
Brotherton et al.

(10) Patent No.: US 9,644,160 B2
(45) Date of Patent: May 9, 2017

(54) INTEGRATED FUEL PRODUCTION AND ELECTRICITY GENERATION

(75) Inventors: Adam Richard Brotherton, Dubuque, IA (US); Mark John Torresani, Middleton, WI (US)

(73) Assignees: CORNERSTONE ENVIRONMENTAL GROUP, LLC, Madison, WI (US); UNISON SOLUTION, INC., Dubuque, IA (US)

( * ) Notice: Subject to any disclaimer, the term of this patent is extended or adjusted under 35 U.S.C. 154(b) by 2079 days.

(21) Appl. No.: 12/793,240

(22) Filed: Jun. 3, 2010

(65) Prior Publication Data

US 2011/0296809 A1     Dec. 8, 2011

(51) Int. Cl.
*C10L 3/08*     (2006.01)
*C10L 3/10*     (2006.01)

(52) U.S. Cl.
CPC ............... *C10L 3/08* (2013.01); *C10L 3/103* (2013.01); *C10L 3/104* (2013.01); *C10L 3/106* (2013.01); *Y02E 50/346* (2013.01)

(58) Field of Classification Search
CPC .. C10L 3/08; C10L 3/103; C10L 3/104; C10L 3/106
USPC ....................................................... 60/39.12
See application file for complete search history.

(56) References Cited

U.S. PATENT DOCUMENTS

| | | | | |
|---|---|---|---|---|
| 5,727,903 A | * | 3/1998 | Borray et al. | 405/128.15 |
| 5,884,494 A | * | 3/1999 | Okoren et al. | 62/126 |
| 6,251,164 B1 | * | 6/2001 | Notaro et al. | 95/99 |
| 6,510,695 B1 | * | 1/2003 | Fisher | 60/780 |
| 6,571,561 B1 | * | 6/2003 | Aquino et al. | 60/772 |
| 7,731,779 B2 | | 6/2010 | Palumbo | |
| 7,815,713 B2 | | 10/2010 | Sorensen et al. | |
| 2004/0224269 A1 | * | 11/2004 | Reifel et al. | 431/11 |
| 2006/0213370 A1 | | 9/2006 | Leonard et al. | |
| 2007/0095205 A1 | * | 5/2007 | Palumbo | 95/51 |
| 2008/0141672 A1 | * | 6/2008 | Shah et al. | 60/648 |

OTHER PUBLICATIONS

Kamphuis, Nathan R., Sonoma LFG to CNG Demonstration Project, SWANA's 32nd Annual Landfill Gas Symposium, Mar. 9-12, 2009, Atlanta, Georgia, 27 pages.

* cited by examiner

*Primary Examiner* — Jacob Amick
(74) *Attorney, Agent, or Firm* — Michael Best & Friedrich LLP

(57) ABSTRACT

A gas inlet configured to convey a gas stream from a feed source to the system. A hydrogen sulfide removal stage includes a first vessel configured to receive a first media. A primary compression stage is configured to elevate a pressure of the gas stream. A moisture removal stage is configured to condense and separate remaining moisture from the gas stream. A siloxane removal stage includes a second vessel configured to receive a second media. A carbon dioxide removal stage includes a single-stage membrane configured to separate carbon dioxide from the gas stream by a permeability characteristic of the gas stream. A secondary compression stage is configured to elevate a pressure of the gas stream to a level suitable for distribution to CNG-compatible vehicles. An electrical generator set has a prime mover configured to be fueled by the gas stream.

20 Claims, 2 Drawing Sheets

INTEGRATED FUEL PRODUCTION AND ELECTRICITY GENERATION

BACKGROUND

The invention relates to the localized production of purified methane at a waste gas source. As a result of chemical reactions and microbes acting upon waste, landfills and anaerobic digesters produce usable quantities of flammable, biogenic gas, known as landfill gas (LFG) or biogas, respectively. While these gas products contain a high percentage of methane, the primary constituent of compressed natural gas (CNG), LFG and biogas in their raw form have limited uses as a fuel. Biogas and LFG contain varying amounts of nitrogen, carbon-dioxide, oxygen, water vapor, hydrogen-sulfide, and other contaminants. Most of these other contaminants are known as "volatile organic compounds" or VOCs. The VOCs usually make up less than one percent of LFG or biogas.

A group of VOC's know as siloxanes can also contaminate the biogas and LFG making it unsuitable for use as a fuel. Siloxane compounds are frequently found in municipal solid waste and municipal wastewater. In landfills and digestion facilities accepting these materials as a component of the feedstock, siloxanes volatilize into biogas. When this gas is combusted in a gas engine, turbine or boiler, siloxanes are converted into silicon dioxide ($SiO_2$) which deposits internally in the combustion chamber, increasing wear and tear.

SUMMARY

In one embodiment, the invention provides a system for producing fuel from a gas stream of biogenic origin. A gas inlet is configured to convey a gas stream from a feed source to the system. A hydrogen sulfide removal stage is operably connected downstream of the gas inlet. The hydrogen sulfide removal stage includes a first vessel configured to receive a first media that removes hydrogen sulfide entrained in a gas stream. A filtration stage is operably connected downstream of the gas inlet and configured to remove particulates and free moisture entrained in the gas stream. A sealed scroll compressor is operably connected downstream of the gas inlet and configured to elevate a pressure of the gas stream. A moisture removal stage is operably connected downstream of the gas inlet and configured to condense and separate remaining moisture from the gas stream. A siloxane removal stage is operably connected downstream of the gas inlet and includes a second vessel configured to receive a second media which removes at least some siloxanes from the gas stream. A carbon dioxide removal stage is operably connected downstream of the gas inlet and includes a single-stage membrane configured to separate carbon dioxide from the gas stream by a permeability characteristic of the gas stream. A secondary compression stage is operably connected downstream of the primary compression stage and configured to elevate a pressure of the gas stream to a level suitable for distribution to CNG-compatible vehicles.

In another embodiment, the invention provides a method of producing fuel and electricity from a gas stream of biogenic origin. A gas stream of biogenic origin is provided. A hydrogen sulfide content of the gas stream is reduced by passing the gas stream through a first media adapted to remove at least some hydrogen sulfide in the gas. A quantity of particulates and free moisture entrained in the gas stream is reduced by passing the gas stream through a filtration stage. The gas stream is compressed within a sealed scroll compressor. A moisture content of the gas stream is reduced by passing the gas through a moisture removal stage configured to condense and separate remaining moisture from the gas stream. A siloxane content of the gas stream by passing the gas stream through a second media adapted to remove at least some siloxanes from the gas stream. The gas stream is selectively directed for at least one of fuel production, electrical generation, and direct use. A carbon dioxide content of the gas stream is reduced by separating carbon dioxide from the gas stream with a single-stage permeable membrane.

In yet another embodiment, the invention provides a system for producing fuel from a gas stream of biogenic origin. A gas inlet is configured to convey a gas stream from a feed source to the system. A hydrogen sulfide removal stage is operably connected downstream of the gas inlet. The hydrogen sulfide removal stage includes a first vessel configured to receive a first media that removes hydrogen sulfide entrained in a gas stream. A filtration stage is operably connected downstream of the gas inlet and configured to remove particulates and free moisture entrained in the gas stream. A primary compression stage is operably connected downstream of the gas inlet and configured to elevate a pressure of the gas stream. A moisture removal stage is operably connected downstream of the gas inlet and configured to condense and separate remaining moisture from the gas stream. A siloxane removal stage is operably connected downstream of the gas inlet. The siloxane removal stage includes a second vessel configured to receive a second media which removes at least some siloxanes from the gas stream. A carbon dioxide removal stage is operably connected downstream of the gas inlet and includes a single-stage membrane configured to divide the gas stream into a permeate gas stream and a residual gas stream. A secondary compression stage is operably connected downstream of the carbon dioxide removal stage and configured to elevate a pressure of the residual gas stream to a level suitable for distribution to CNG-compatible vehicles. A permeate discharge line is operably connected downstream of the carbon dioxide removal stage and configured to supply the permeate gas stream for use in at least one of an electrical generator set and a direct-use component.

In still another embodiment, the invention provides a method of producing fuel and electricity from a gas stream of biogenic origin. A gas stream of biogenic origin is provided. A hydrogen sulfide content of the gas stream is reduced by passing the gas stream through a first media adapted to remove at least some hydrogen sulfide in the gas. A quantity of particulates and free moisture entrained in the gas stream is reduced by passing the gas stream through a filtration stage. The gas stream is compressed within a primary compression stage with a first compressor. A moisture content of the gas stream is reduced by passing the gas through a the moisture removal stage configured to condense and separate remaining moisture from the gas stream. A siloxane content of the gas stream is reduced by passing the gas stream through a second media adapted to remove at least some siloxanes from the gas stream. A carbon dioxide content of the gas stream with a single-stage membrane configured to divide the gas stream into a permeate gas stream and a residual gas stream. A pressure of the residual gas stream is elevated to a level suitable for distribution to CNG-compatible vehicles with a secondary compression stage. The permeate gas stream to be used as a fuel is supplied to at least one of an electrical generator set and a direct-use component.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawing. The invention is capable of other embodiments and of being practiced or of being carried out in various ways.

Figure 1:
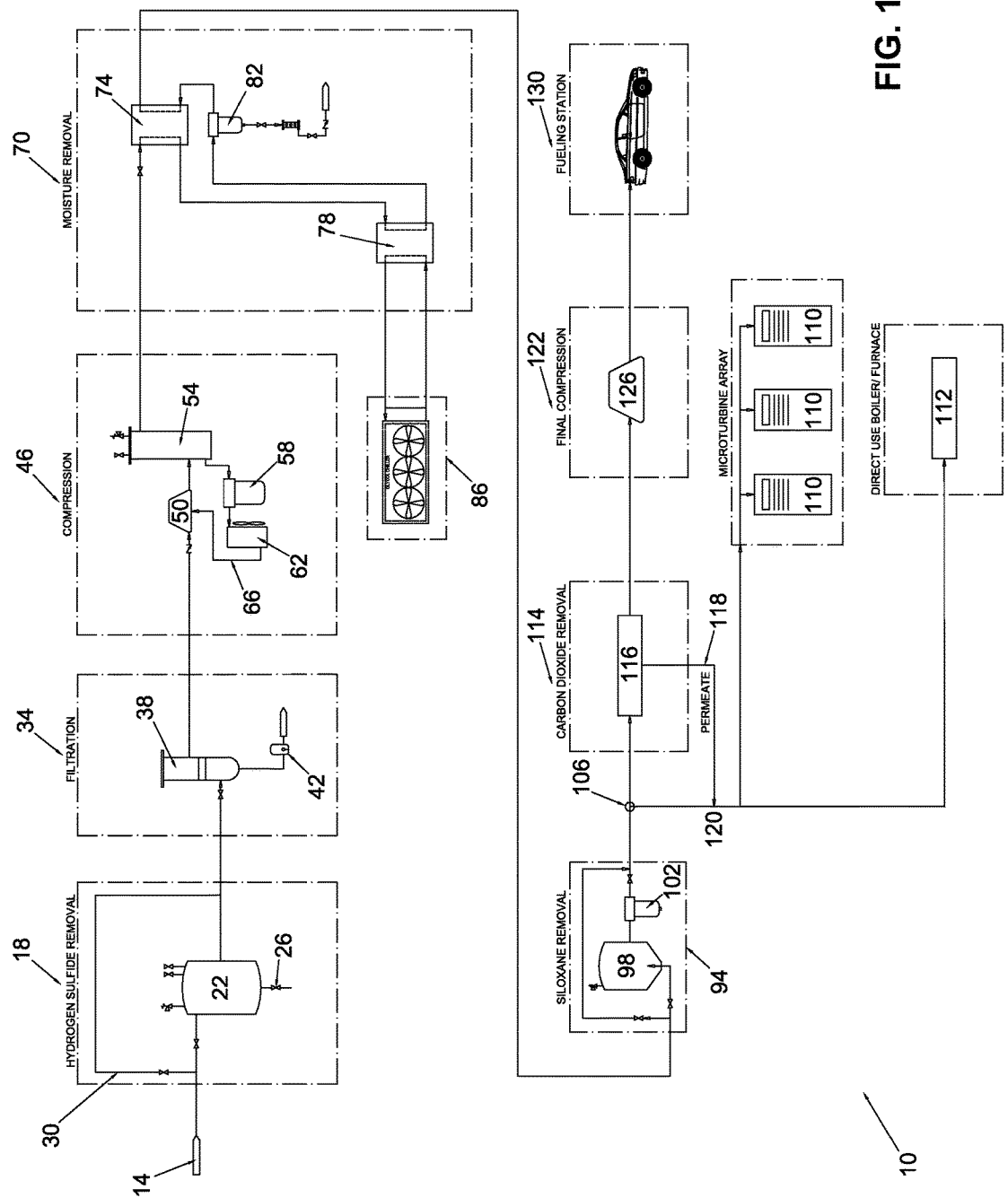
FIG. 1 is a block diagram of an integrated fuel production according to one aspect of the invention.

FIG. 1 is a block diagram of an integrated fuel production and electricity generation system 10 for on-site use where a source of flammable feed gas of biogenic origin (LFG or biogas) is available. As described herein, "gas" shall be used generally to describe both LFG and biogas within the system. The system 10 provides a means of producing clean, purified methane for use in compressed natural gas (CNG) vehicles, gas for use in an electrical generator-set or gas for direct use in a boiler or furnace.

The feed gas enters the system 10 at a gas inlet 14. Pressure at the inlet 14 may be a positive or negative gauge value, in the range from approximately negative 50 inches of water to approximately positive 20 inches of water. The system 10 described herein is operable with gas flow rates from approximately 5 to approximately 200 scfm. As explain in greater detail below, from approximately 5 scfm to approximately 80 scfm, preferably from approximately 20 scfm to approximately 40 scfm, is directed to produce a gas suitable for use as a CNG-substitute. In some embodiments, the feed gas first flows through a moisture and particulate inlet filter upstream of the gas inlet (not shown). The moisture and particulate inlet filter reduces contamination and fouling of the downstream components. The inlet filter is designed to provide 99% removal of 3 micron or larger particulates and liquid droplets. A mesh polypropylene filter element is removable and cleanable. The moisture and particulate inlet filter includes a differential pressure gauge and a high level switch at a condensate drain.

From the gas inlet 14, feed gas first enters a hydrogen-sulfide removal stage 18. In the illustrated embodiment, the hydrogen-sulfide removal stage 18 includes at least one hydrogen sulfide removal vessel 22 filled with an iron-oxide based media, such as SULFATREAT media. In one embodiment, the vessel 22 is constructed of 304L stainless steel. A condensate drain 26 is provided on a lower surface of the vessel. The SULFATREAT media is designed to reduce the hydrogen sulfide content of the gas from up to approximately 1500 ppmv down to approximately 4 ppmv. The SULFATREAT media is exchanged or regenerated once it no longer reduces hydrogen sulfide to acceptable levels. In some embodiments, multiple hydrogen sulfide removal vessels 22 are provided in a parallel array. One vessel 22 can be on service and the media replaced or regenerated while at least one other vessel remains on-line. The hydrogen-sulfide removal vessel 22 may include a variety of instrumentation, including an inlet pressure transmitter, inlet pressure gauge, inlet temperature detector, and an inlet temperature gauge.

In an alternative embodiment, the feed gas passes through a canister filled with a generic hydrated iron(III) oxide media, which combines with hydrogen sulfide in the following reaction:

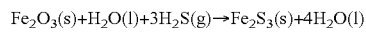

$$Fe_2O_3(s)+H_2O(l)+3H_2S(g) \rightarrow Fe_2S_3(s)+4H_2O(l)$$

In some embodiments, iron(III) oxide canisters may be reusable through a regeneration process. In order to regenerate iron(III) oxide, the container must be taken out of service, flooded with water and aerated.

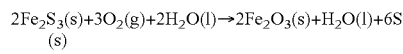

$$2Fe_2S_3(s)+3O_2(g)+2H_2O(l) \rightarrow 2Fe_2O_3(s)+H_2O(l)+6S(s)$$

Upon completion of the regeneration reaction, the container is drained of water and can be returned to service. In some embodiments, where both regeneration and continuous operation are desired, multiple iron(III)oxide canisters may be provided in a parallel arrangement. In yet another embodiment, an iron sponge may perform the hydrogen sulfide removal function. In still another embodiment, activated or impregnated carbon products may be used.

The hydrogen sulfide removal stage 18 may only be required where the feed gas contains appreciable quantities of hydrogen sulfide gas. For certain feed gases, such as a biogas produced from a controlled feed stock, there may be no significant quantities of hydrogen sulfide. Therefore, a bypass line 30 is provided for constructions where the hydrogen sulfide filter is not needed. In other embodiments, such as where the system will only be used with a feed gas of consistent and known quality, this stage could be considered optional or unnecessary.

After the gas passes through the hydrogen sulfide removal stage, the gas flows through a pre-compression filtration stage 34. The purpose of the pre-compression filtration stage 34 is to remove additional particulates and free moisture from the gas in order to reduce damage to downstream components of the system. A filter housing 38 contains a filter element. In one embodiment, the filter element is a mesh polypropylene filter element that is removable and cleanable. A gravity drain 42 is provided at a bottom portion of the filter housing 38 to reduce the accumulation of liquids within the filter. The gas which is discharged from the filter housing 38 still contains a high percentage of carbon dioxide, volatile organic compounds (VOCs) and other undesirable constituents.

Gas discharged from the filter housing 38 next enters a primary compression stage 46. In the illustrated embodiment, a scroll compressor 50 provides compression. A scroll compressor is a form of positive displacement, rotary compressor. In the illustrated embodiment, the scroll compressor 50 is a sealed, oil-flooded, direct drive, 480V, 3-phase, 60 Hz unit, sized for a 20 to 40 scfm flow-rate and with a motor rating of between approximately 10 hp and approximately 20 hp. The scroll compressor 50 has a 250 degree Fahrenheit operating temperature to inhibit the formation of condensation. In other embodiments, other types and sizes of positive displacement or dynamic compressors may be used.

For those embodiments where an oil-flooded compressor is used, it is necessary to remove compressor lubricants from the gas. An oil/gas separator 54 is provided to extract the oil from the gas. Downstream of the oil/gas separator, an oil filter 58 is provided to clean particulate contaminants from the oil. An ambient-air oil cooler 62 is provided downstream of the oil filter 58. Cooled oil is returned to the compressor via a return line 66 from the oil cooler 62.

After primary compression, the compressed gas passes through a moisture removal stage 70. The moisture removal stage 70 includes a first heat exchanger 74, a second heat exchanger 78, and a condensate trap 82.

The compressed gas exiting the primary compression stage 46 first enters the first heat exchanger 74. The first heat exchanger 74 is a gas to gas heat exchanger which pre-cools gas entering the moisture removal stage 70 with cool gas exiting the moisture removal stage 70. The first heat exchanger 74 may be a brazed plate type, constructed of 304L stainless steel with nickel/chrome brazing. In one construction, the first heat exchanger 74 is sized to reheat gas exiting the second heat exchanger 78 from 40 degrees Fahrenheit to approximately 80 degrees Fahrenheit, while pre-cooling the gas before entering the second heat exchanger 78.

The pre-cooled gas exiting the first heat exchanger 74 enters the second heat exchanger 78, which is a gas to glycol type. In the second heat exchanger 78, the gas is cooled below its dewpoint, thereby causing at least some of the entrained moisture to condense. A recirculating flow of glycol is provided by an external chiller unit 86. The glycol chiller 86 includes a hermetic scroll pump and a brazed plate evaporator. The glycol chiller 86 is designed to provide 35 degree Fahrenheit glycol to the second heat exchanger.

Downstream of the second heat exchanger, the condensate trap 82, or water knockout, captures water condensate entrained in the cooled gas. The dry gas exiting the condensate trap 82 is then re-heated as it passes through the first heat exchanger 74 opposite the hot inlet gas. It should be appreciated that various other heat exchanger arrangements are possible in the moisture removal stage, and various other drying means may be substituted. In some embodiments, coalescing filters may be used in place of or in conjunction with the described moisture removal system. In some embodiments, regenerative desiccant towers may be used to dry the gas, as is known in the art.

After exiting the moisture removal stage 70, the dry, re-heated gas enters a siloxane removal stage 94. In the siloxane removal stage 94, silicon-based compounds and VOC's are removed. In the illustrated embodiment, the siloxane removal stage 94 includes a media vessel 98 constructed of 304L stainless steel. The media vessel 98 is filled with a type of activated carbon that is specifically engineered for the removal of siloxanes and similar contaminants from landfill and digester gas sources. In other embodiments, various types of activated charcoal may be used to filter out siloxane and VOCs. In yet another alternative embodiment, a molecular sieve may be used for siloxane filtration.

A particulate filter 102 is provided downstream of the media vessel 98 in order to capture any filter media that may have become entrained in the gas flow.

After exiting the siloxane removal stage 94, the compressed gas is dry and substantially free of oils, VOCs and silicates. The methane percentage is not yet suitable for use as a vehicle fuel in a CNG-compatible internal combustion engine. However, the methane percentage at this point may be high enough to fuel a stationary prime mover driving an electric generator or burned in a boiler or furnace (i.e., "direct use"). The prime mover for electrical generation may be a micro-turbine or an internal combustion engine such as a reciprocating piston type. It should be noted, however, that for certain LFG sources, the methane percentage may be too low for use in a prime mover.

As should be well understood in the art, various means may be used to direct the flow of gas either for immediate use in a generator set, boiler, or furnace or for additional filtration to produce a fuel suitable for use in a CNG-compatible vehicle. In some embodiments, a three-way valve may be provided at a diversion point 106, or two or more solenoid actuated valves may be provided for remotely controlling the end-use of the gas. In still other embodiments, the system can be operated with simultaneous flow to both the generator set and the additional filters.

In the illustrated embodiment, a plurality of generator sets 110 operate in parallel. Each generator set 110 includes a micro-turbine acting as the prime-mover for an electric generator, which is in turn connected with an electric power grid. Each generator has an inverter that converts a generated DC voltage and current into AC voltage and current, via power electronics and microprocessors. The inverter system also provides over/under voltage and over/under frequency protective relaying and automatically synchronizes with the voltage and frequency from the electric power grid. In other constructions, synchronous generators may be employed, thereby eliminating the need for inverters and rectifiers.

In still other embodiments, reciprocating piston or other combustion engine types may be used in place of the micro-turbines. In some embodiments, a gas accumulator may be provided up stream of the generator set to provide a volume of available gas for uninterrupted operation of the generator set.

In the illustrated embodiment, a direct use component 112 is provided in parallel to the generator sets 110. The direct use component 112 may be, for example, a boiler or a furnace.

If electrical generation or direct use in a boiler or furnace is not the desired end use of the gas, the gas is directed downstream in the system 10 to undergo additional processing. Gas which is to be used in CNG-compatible vehicles, for example, must have the carbon dioxide content lowered in order to provide a suitable fuel. A carbon dioxide removal stage 114 is provided to lower the carbon dioxide content in order to raise the methane percentage to at least approximately 80 percent, preferably to at least approximately 90 percent, and even more preferably to approximately 95 percent.

In the illustrated embodiment, carbon dioxide removal is accomplished by a single-stage membrane system 116. In other embodiments, a series of two or more membranes may be employed to reach the desired methane percentage. Carbon dioxide membranes operate on the principle of selective permeation through a radial membrane body. Each gas constituent has a specific permeation rate through a radial wall of the membrane. The rate of permeation is determined by the rate with which a gas constituent dissolves into the membrane surface and the rate at which it diffuses inwardly radially through the membrane. Gas constituents with higher permeation rates will permeate through the membrane faster than constituents with lower permeation rates.

Carbon dioxide has a faster permeation rate than methane. When a gas consisting of at least carbon dioxide and methane contacts the membrane, the carbon dioxide will permeate through the membrane faster than the methane. Thus, the gas feed is separated into a methane-rich stream on the interior of the membrane (i.e., a "residual stream") and a carbon dioxide-rich stream on the exterior of the membrane (i.e., a "permeate stream"). The primary driving force of the separation is the differential partial pressure of the permeating component. Therefore, the pressure difference between the feed gas and permeate gas and the concentration of the permeating component determine the product purity and the amount of carbon dioxide membrane surface required. A flow control valve may be employed to modulate this pressure difference. Upon discharge from the carbon dioxide removal stage 114, the residual gas is usable as a substitute for CNG. In the illustrated embodiments, the flow rate of the residual gas stream is between approximately 5 scfm and approximately 80 scfm, and preferably between 20 and 40 scfm.

Permeate gas is discharged from the carbon dioxide removal stage 114 via a permeate discharge line 118. The permeate gas is blended at a junction 120 with gas discharged from the siloxane removal stage 94, to be used as a fuel for electrical generation or direct use. In other embodiments, the permeate discharge line may be connected to a flare or other disposal means.

In order to fuel CNG-capable vehicles and to provide for efficient storage, the methane-rich residual gas undergoes additional compression in a second compressor stage 122. A second gas compressor 126 is provided in order to elevate the pressure to a level suitable for storage and fueling. The gas compressor 126 discharges to a fuel storage and distribution point 130, where accumulated gas may be stored and used to fuel CNG-compatible vehicles such as cars, trucks, forklifts and other on- and off-road equipment. Suitable pressures for storing and distributing the gas are between approximately 2000 psi and approximately 4000 psi, though higher or lower storage pressures may be used.

In one construction of the system, all of the components described above, except for the hydrogen sulfide removal system, glycol chiller and siloxane removal system are mounted on a transportable skid. A centralized control panel may be provided, with indication and controls to monitor and vary system parameters.

In one example, the system is positioned adjacent an anaerobic digester. The anaerobic digester produces biogas that is composed of approximately 55 to 70 percent methane, approximately 30 to 45 percent carbon dioxide, and less than approximately 1 percent other constituents. The other constituents may include VOCs, hydrogen sulfide, and siloxanes. The raw biogas first enters a hydrogen-sulfide removal stage. In the hydrogen-sulfide removal stage, the biogas flows through a hydrogen sulfide removal vessel filled with an iron-oxide based media, such as SULFATREAT media. SULFATREAT media reduces the hydrogen sulfide content of the gas from up to approximately 1500 ppmv down to approximately 4 ppmv. Once most of the hydrogen sulfide has been removed, the biogas flows through a pre-compression filtration stage to remove additional particulates and free moisture. Biogas discharged from the filter next enters a primary compression stage where the biogas is pressurized. The pressurized biogas then flows through a moisture removal stage, where any remaining moisture is condensed and drained off. The dry biogas exiting the moisture removal stage then passes through a siloxane removal stage where siloxanes and VOCs are removed. At this point, the biogas consists of approximately 56 to 71 percent methane and approximately 29 to 44 percent carbon dioxide. If the biogas is to be used for electricity generation, it is directed toward a micro-turbine array, which acts as prime-mover for a plurality of electric generators. If the biogas is to be used as a vehicle fuel, it passes through a carbon dioxide removal stage. Carbon dioxide permeate is separated from the residual biogas such that the residual biogas has a methane content of approximately 80 to 95 percent. After carbon dioxide removal, the biogas is suitable for use as a CNG substitute. The biogas undergoes a final compression, raising the biogas pressure to a level suitable for storage or fueling of CNG-compatible vehicles.

In another example, the system is positioned adjacent a landfill. The landfill produces raw LFG that is typically composed of approximately 45-55 percent methane, 45-55 percent carbon dioxide, 0 to 10 percent nitrogen gas, 0 to 5 percent oxygen gas, and less than 1 percent other constituents. The other constituents may include VOCs, hydrogen sulfide, and siloxanes. The raw LFG first enters a hydrogen-sulfide removal stage. In the hydrogen-sulfide removal stage, the LFG first passes through a hydrogen sulfide removal vessel filled with an iron-oxide based media, such as SULFATREAT media. The SULFATREAT media reduces the hydrogen sulfide content of the LFG from up to approximately 1500 ppmv down to approximately 4 ppmv. Once most of the hydrogen sulfide has been removed, the LFG flows through a pre-compression filtration stage to remove additional particulates and free moisture. LFG discharged from the filter next enters a primary compression stage where the LFG is pressurized. The pressurized LFG then flows through a moisture removal stage, where any remaining moisture is condensed and drained off. The dry LFG exiting the moisture removal stage then passes through a siloxane removal stage where siloxanes and VOCs are removed. At this point, the LFG consists of approximately 45 to 55 percent methane and 45 to 55 percent carbon dioxide. If the LFG is to be used for electricity generation, it is directed toward a micro-turbine array, which acts as prime-mover for a plurality of electric generators. If the LFG is to be used as a vehicle fuel, it passes through a carbon dioxide removal stage. It should be noted that the carbon dioxide removal stage may also be necessary for generator use where the carbon dioxide content of the raw LFG feed is too high for use with the prime mover. Carbon dioxide permeate is separated from the residual LFG such that the residual LFG has a methane content of approximately 80 to 95 percent. After carbon dioxide removal, the biogas is suitable for use as a CNG substitute. The biogas undergoes a final compression, raising the biogas pressure to a level suitable for storage or fueling of CNG-compatible vehicles.

Figure 2:
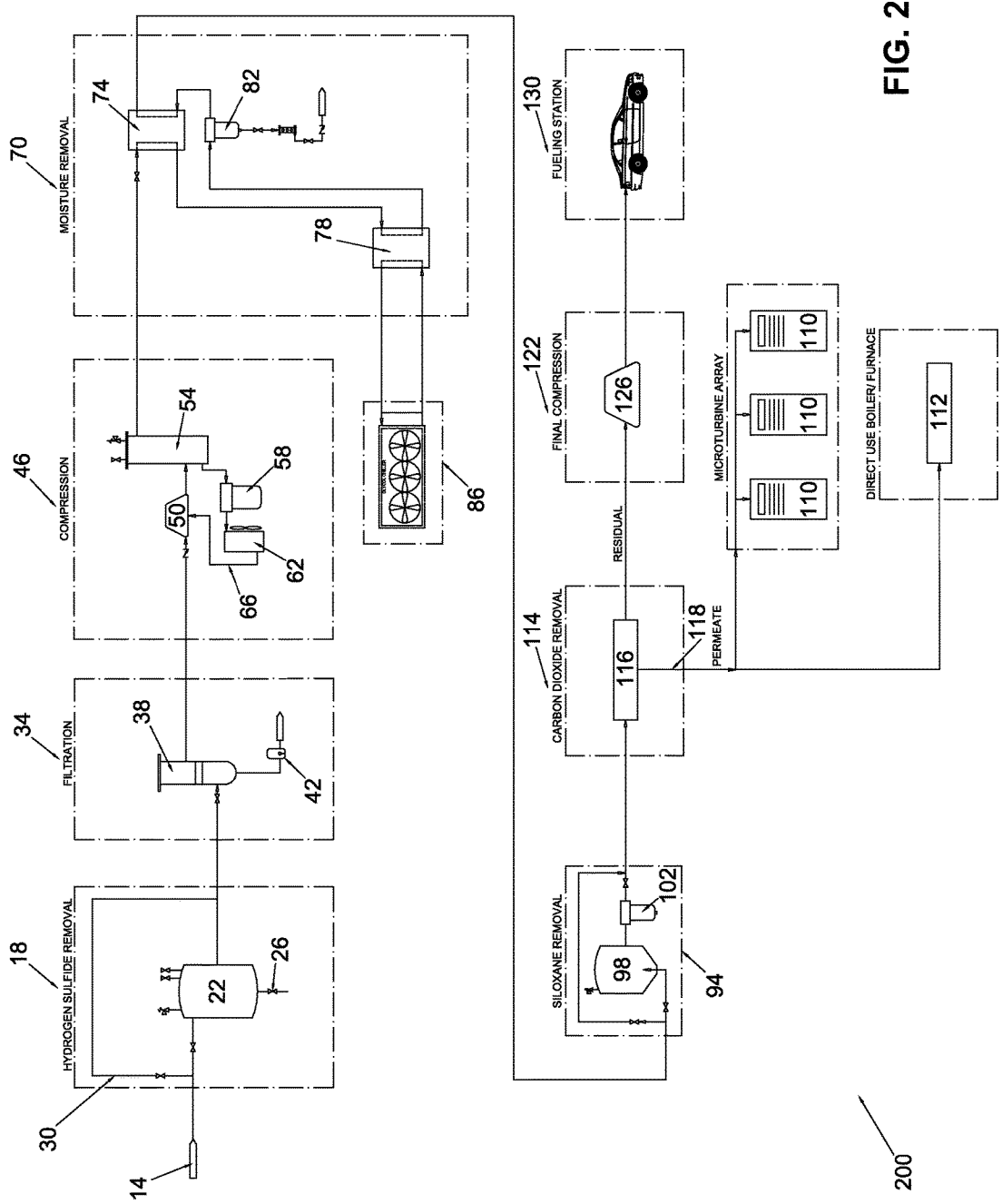
FIG. 2 is a block diagram of an integrated fuel production system according to another aspect of the invention.

FIG. 2 is a block diagram of an alternative embodiment of an integrated fuel production and electricity generation system 200. Most components of system 200 are common to the system 10 described previously described. Common components have been given the same reference numerals described above.

The system 200 is configured such that a generator set 110 and/or a direct use component 112 is fueled directly by un-blended permeate gas from the permeate discharge line 118. The configuration of system 200 maximizes the flow rate of gas available for the production of fuel for use as a CNG substitute, while recovering energy from the permeate gas for other uses.

Thus, the invention provides, among other things, a system and method for the integrated production of fuel for use in CNG-compatible vehicles, generation of electricity and direct use in a boiler or furnace. Various features and advantages of the invention are set forth in the following claims.

What is claimed is:

1. A system for producing fuel from a gas stream of biogenic origin, the system comprising:
    a gas inlet configured to convey a gas stream from a feed source to the system;
    a hydrogen sulfide removal stage operably connected downstream of the gas inlet, the hydrogen sulfide removal stage including a first vessel configured to receive a first media that removes hydrogen sulfide entrained in a gas stream;

a filtration stage operably connected downstream of the gas inlet and configured to remove particulates and free moisture entrained in the gas stream;

a primary compression stage operably connected downstream of the gas inlet and configured to elevate a pressure of the gas stream;

a moisture removal stage operably connected downstream of the gas inlet and configured to condense and separate remaining moisture from the gas stream;

a siloxane removal stage operably connected downstream of the gas inlet, the siloxane removal stage including a second vessel configured to receive a second media which removes at least some siloxanes from the gas stream;

a carbon dioxide removal stage operably connected downstream of the gas inlet and including a single-stage membrane configured to divide the gas stream into a permeate gas stream and a residual gas stream;

a secondary compression stage operably connected downstream of the carbon dioxide removal stage and configured to elevate a pressure of the residual gas stream to a level suitable for distribution to CNG-compatible vehicles; and a permeate discharge line extending from the carbon dioxide removal stage that directs the permeate gas stream either directly into at least one of an electrical generator set and a direct-use component, or to a junction where the permeate gas stream is blended with gas discharged from the siloxane removal stage and then sent directly into the at least one of an electrical generator set and a direct-use component.

2. The system of claim 1, wherein the at least one of an electrical generator set and a direct-use component is an electrical generator set comprising:

a prime mover configured to be fueled by the permeate gas stream; and an electric generator connected to the prime mover and configured to generate electricity.

3. The system of claim 2, wherein the prime mover comprises a micro-turbine.

4. The system of claim 2, wherein the prime mover comprises an internal combustion engine.

5. The system of claim 1, wherein the at least one of an electrical generator set and a direct-use component is a direct-use component comprising at least one of a boiler and a furnace.

6. The system of claim 1, wherein the gas stream includes landfill gas (LFG).

7. The system of claim 1, where the gas stream includes biogas from an anaerobic digester.

8. The system of claim 1, wherein the hydrogen sulfide removal stage includes a bypass line for bypassing the hydrogen sulfide removal vessel.

9. The system of claim 1, wherein the first media includes an iron-oxide based media.

10. The system of claim 1, wherein the second media includes activated carbon.

11. The system of claim 1, wherein a gas stream flow rate at the gas inlet is between approximately 5 scfm and approximately 200 scfm.

12. The system of claim 1, wherein a flow rate of the residual gas stream is between approximately 5 scfm and approximately 80 scfm.

13. The system of claim 1, wherein the primary compression stage comprises a scroll compressor.

14. The system of claim 13, wherein the scroll compressor has a motor rating of between 10 horsepower and 20 horsepower.

15. The system of claim 1, wherein the moisture removal stage includes a glycol chiller unit.

16. A method of producing fuel and electricity from a gas stream of biogenic origin, the method comprising:

providing a gas stream of biogenic origin;

reducing a hydrogen sulfide content of the gas stream by passing the gas stream through a first media adapted to remove at least some hydrogen sulfide in the gas;

reducing a quantity of particulates and free moisture entrained in the gas stream by passing the gas stream through a filtration stage;

compressing the gas stream within a primary compression stage with a first compressor;

reducing a moisture content of the gas stream by passing the gas through a the moisture removal stage configured to condense and separate remaining moisture from the gas stream;

reducing a siloxane content of the gas stream by passing the gas stream through a second media adapted to remove at least some siloxanes from the gas stream;

reducing a carbon dioxide content of the gas stream with a single-stage membrane configured to divide the gas stream into a permeate gas stream and a residual gas stream;

elevating a pressure of the residual gas stream to a level suitable for distribution to CNG-compatible vehicles with a secondary compression stage; and directing the permeate gas stream through a permeate discharge line that extends downstream from the single-stage membrane either directly to at least one of an electrical generator set and a direct-use component, or to a junction where the permeate gas stream is blended with gas discharged from the siloxane removal stage and then sent directly into the at least one of an electrical generator set and a direct-use component.

17. The method of claim 16, wherein a flow rate of the gas stream is between approximately 5 scfm and approximately 200 scfm.

18. The method of claim 16, wherein a flow rate of the residual gas stream flow rate is between approximately 5 scfm and approximately 80 scfm.

19. The method of claim 16, wherein the residual gas stream is suitable for use in CNG-compatible vehicles.

20. The method of claim 16, further comprising:

elevating the pressure of the gas stream to a level suitable for distribution to CNG-compatible vehicles with a secondary compressor; and storing a volume of gas discharge from the secondary compressor at a vehicle fueling point.

* * * * *